(12) United States Patent
Gatti et al.

(10) Patent No.: US 8,090,522 B2
(45) Date of Patent: Jan. 3, 2012

(54) AIR PRESSURE CONTROL SYSTEMS AND METHODS FOR TURBOCHARGER SYSTEMS

(75) Inventors: Marco J. Gatti, Southgate, MI (US); Paul A. Bauerle, Fenton, MI (US); James L. Worthing, Munith, MI (US); Layne K. Wiggins, Plymouth, MI (US); J. Oscar Aparicio, Jr., Milford, MI (US); Joseph E. Ploucha, Commerce Township, MI (US)

(73) Assignee: GM Global Technology Operations LLC

( * ) Notice: Subject to any disclaimer, the term of this patent is extended or adjusted under 35 U.S.C. 154(b) by 220 days.

(21) Appl. No.: 12/623,695

(22) Filed: Nov. 23, 2009

(65) Prior Publication Data

US 2011/0125384 A1 May 26, 2011

(51) Int. Cl.
*F02D 11/10* (2006.01)
(52) U.S. Cl. ........................ 701/110; 123/399
(58) Field of Classification Search .................. 123/350, 123/399; 701/110; 73/114.04, 114.25, 114.32, 73/114.33, 114.37
See application file for complete search history.

(56) References Cited

U.S. PATENT DOCUMENTS

| 5,297,064 | A | 3/1994 | Bauerle |
| 7,140,356 | B2 * | 11/2006 | Kishibata et al. ............. 123/492 |
| 7,668,687 | B2 * | 2/2010 | Bauerle ........................ 702/138 |
| 2010/0152992 | A1 * | 6/2010 | Burkhardt et al. ............ 701/102 |

OTHER PUBLICATIONS

U.S. Appl. No. 12/105,601, filed Apr. 18, 2008, Bauerle.

\* cited by examiner

*Primary Examiner* — Hai Huynh (57) ABSTRACT

A system for an engine with a turbocharger system includes a rate determination module, a limiting rate selection module, a throttle inlet absolute pressure (TIAP) calculation module, and a throttle control module. The rate determination module generates a pressure rate value based on a pressure difference between a current TIAP signal from a TIAP sensor and a previous TIAP signal. The limiting rate selection module selects a limiting rate based on the pressure rate value. The TIAP calculation module generates a calculated TIAP signal based on the limiting rate and the current TIAP signal. The throttle control module generates a throttle control signal based on the calculated TIAP signal and actuates an inlet throttle valve of the engine based on the throttle control signal.

20 Claims, 8 Drawing Sheets

AIR PRESSURE CONTROL SYSTEMS AND METHODS FOR TURBOCHARGER SYSTEMS

FIELD

The present disclosure relates to internal combustion engines, and more particularly to controlling air pressure generated by a turbocharger system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine (ICE) combusts an air/fuel mixture to produce drive torque for a vehicle. Combustion byproducts are exhausted from the vehicle via an exhaust system. Exhaust gas from the exhaust system may be received by a turbocharger system. The turbocharger system increases torque output of the ICE by increasing air flow to the ICE. The turbocharger system compresses and increases flow of inlet air based on flow rate of the exhaust gas. The compressed inlet air is drawn into cylinders of the ICE via an intake manifold for combustion purposes.

A turbocharger system may be a single-stage or multi-stage system. A single-stage system may include a single turbine that increases boost pressure in an intake manifold. A multi-stage system may include a primary turbine and a secondary turbine that are arranged in series. The primary turbine and the secondary turbine receive exhaust gas and provide respective compressed levels of air charge to an intake manifold.

As a multi-stage system example, exhaust gas may flow through a primary turbine at low engine speeds (e.g., less than 3,000 rpm). The flow of the exhaust gas can increase boost pressure in the primary turbine. The boost pressure increases as the engine speed increases. The boost pressure may be controlled by opening a bypass valve (BPV). For example, the BPV may be opened to allow the exhaust gas to bypass the primary turbine when the boost pressure is greater than a predetermined threshold.

The compressed exhaust gas from the primary turbine may be directed to a secondary turbine. The secondary turbine is operated at greater boost pressure than the primary turbine at high engine speeds (e.g., greater than 3,000 rpm). The boost pressure in the secondary turbine may be controlled by opening a wastegate. For example, the wastegate may be opened to allow the exhaust gas to bypass the secondary turbine to reduce pressure.

Reducing boost pressure via the BPV and/or the wastegate can cause a pressure drop in an intake manifold. An engine control system may compensate for the pressure drop by maintaining a throttle position or by increasing a throttle opening to increase air flow into cylinders of an engine. This compensation can cause an increase in vehicle acceleration. The increase in vehicle acceleration is referred to as a sail-on condition. The sail-on condition can increase exhaust emissions; cause engine instability; and/or reduce fuel economy.

SUMMARY

In one embodiment, a system for an engine with a turbocharger system is provided that includes a rate determination module, a limiting rate selection module, a throttle inlet absolute pressure (TIAP) calculation module, and a throttle control module. The rate determination module generates a pressure rate value based on a pressure difference between a current TIAP signal from a TIAP sensor and a previous TIAP signal. The limiting rate selection module selects a limiting rate based on the pressure rate value. The TIAP calculation module generates a calculated TIAP signal based on the limiting rate and the current TIAP signal. The throttle control module generates a throttle control signal based on the calculated TIAP signal and actuates an inlet throttle valve (ITV) of the engine based on the throttle control signal.

In other features, a method of controlling air pressure in an engine with a turbocharger system is provided. The method includes generating a pressure rate value based on a pressure difference between a current TIAP signal from a TIAP sensor and a previous TIAP signal. A limiting rate is selected based on the pressure rate value. A calculated TIAP signal is generated based on the limiting rate and the current TIAP signal. A throttle control signal is generated based on the calculated TIAP signal. An ITV of the engine is actuated based on the throttle control signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In addition, although the following embodiments are described primarily with respect to example internal combustion engines, the present disclosure may apply to other engines. For example, the present disclosure may apply to compression ignition, spark ignition, homogenous spark ignition, homogeneous charge compression ignition, stratified spark ignition, and spark assisted compression ignition engines.

An engine may be configured with a turbocharger to regulate airflow supplied to cylinders of the engine. The turbocharger boosts air pressure in an intake manifold using energy from flow of exhaust gas. The flow of exhaust gas may be controlled by multiple control actuators, such as a wastegate and a bypass valve (BPV). The wastegate and/or BPV may be opened to reduce pre-throttle intake air pressure. This reduction in air pressure can cause a pre-throttle pressure drop.

An engine control system may compensate for the pre-throttle pressure drop by controlling position of an intake throttle valve (ITV). The ITV is used to regulate an amount of pre-throttle intake air supplied to the cylinders based on a throttle inlet absolute pressure (TIAP) signal from a TIAP sensor. The TIAP sensor generates the TIAP signal that is indicative of an absolute pressure upstream of the ITV. A sail-on condition can result due to non-linear characteristics of the pre-throttle intake airflow. The embodiments disclosed herein minimize duration of and/or prevent sail-on conditions.

Figure 1:
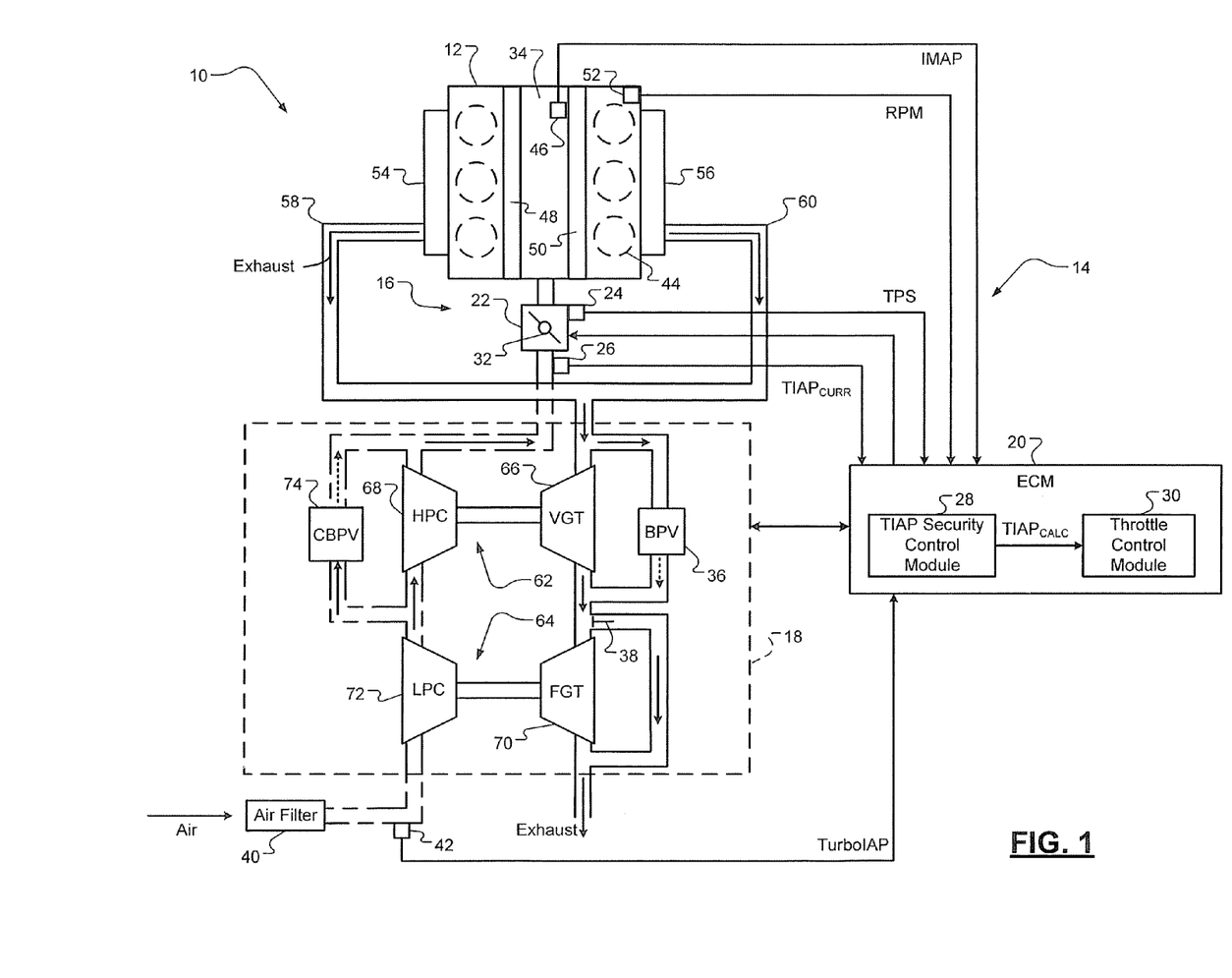
FIG. 1 is a functional block diagram of an exemplary engine control system in accordance with an embodiment of the present disclosure.

In FIG. 1, an exemplary engine control system 10 of a vehicle is shown. The engine control system 10 may include an engine 12 and an airflow control system 14. The engine 12 combusts an air/fuel mixture to produce drive torque for a vehicle based on engine operating parameters, user inputs, and environmental conditions.

The airflow control system 14 may include a throttle control system 16 and a turbocharger system 18. The throttle control system 16 may include an engine control module (ECM) 20, an ITV 22, a throttle position sensor (TPS) 24, and a TIAP sensor 26. The ECM 20 may include a TIAP security control module 28 and a throttle control module 30.

The TIAP security control module 28 coordinates control of the ITV 22 based on a current TIAP signal $TIAP_{CURR}$ from the TIAP sensor 26. The TIAP security control module 28 controls an amount of pre-throttle intake air based on the current TIAP signal $TIAP_{CURR}$. The TIAP sensor 26 generates the current TIAP signal $TIAP_{CURR}$ that is indicative of an absolute pressure upstream of the ITV 22.

Figure 2:
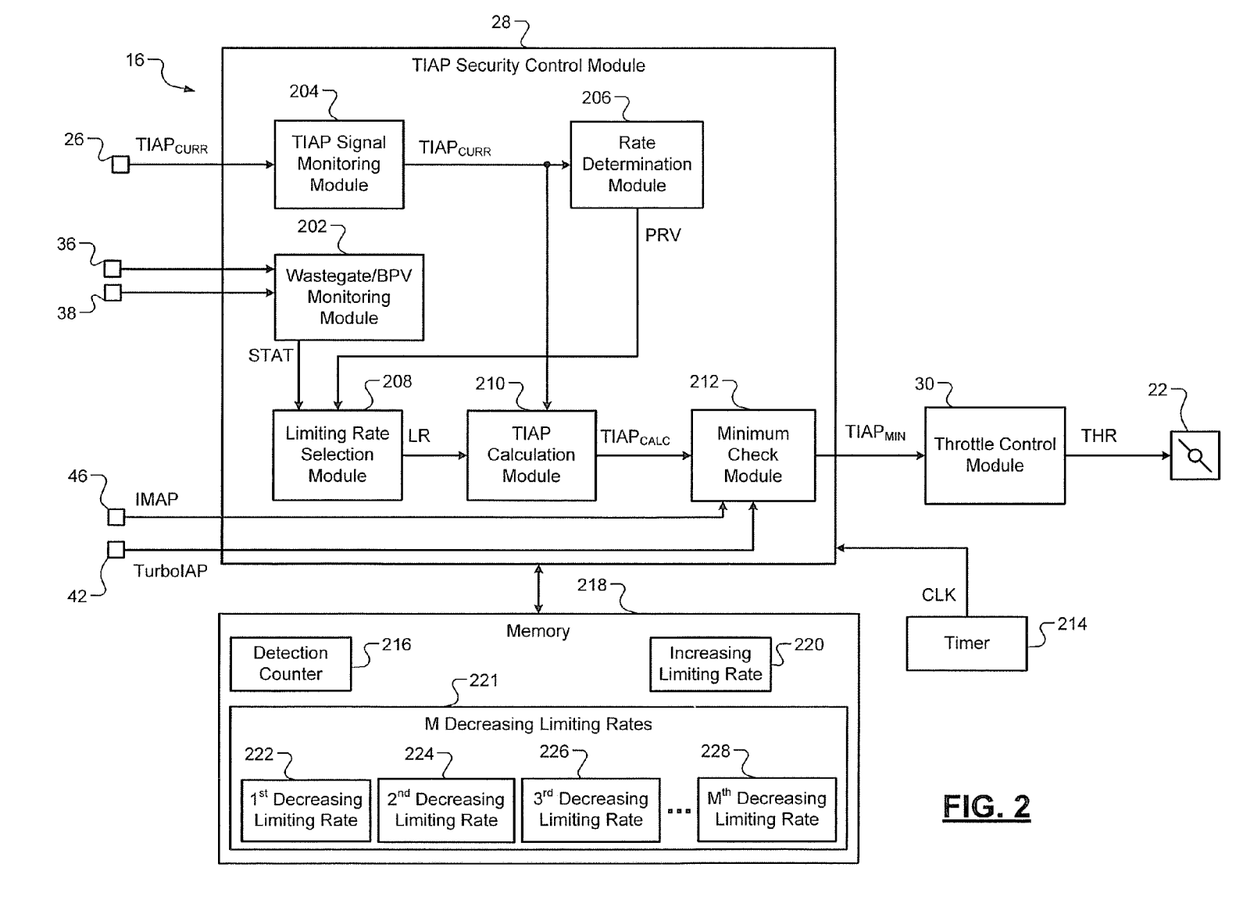
FIG. 2 is a functional block diagram of a throttle control system in accordance with an embodiment of the present disclosure.

The throttle control module 30 controls opening and closing of the ITV 22 based on a calculated TIAP signal $TIAP_{CALC}$ from the TIAP security control module 28. The throttle control module 30 may monitor a position of the ITV 22 using one or more TPS(s) 24. The TPS 24 generates a throttle position signal TPS that is indicative of a position of a throttle blade 32 in the ITV 22. An example of the TIAP security control module 28 and the throttle control module 30 is illustrated in FIG. 2.

The turbocharger system 18 receives exhaust gases and provides a compressed air charge to an intake manifold 34. The turbocharger system 18 may include a BPV 36 and a wastegate 38 to control an amount of air supplied to the intake manifold 34. The BPV 36 and/or the wastegate 38 may be actuated passively (e.g., via a vacuum-driven valve) or actively (e.g., via an electronic throttle controller) by the ECM 20.

The BPV 36 and/or the wastegate 38 may be used to prevent an accumulation of boost pressure in the turbocharger system 18 that is greater than a predetermined threshold. For example, the ECM 20 may modulate the boost pressure by controlling positions of the BPV 36 and/or the wastegate 38 in the turbocharger system 18. Although FIG. 1 depicts a two-step turbocharger system, the present disclosure is applicable to other types of turbocharger systems.

During engine operation, air is received via an air filter 40 and travels past a turbocharger inlet absolute pressure (TCIAP) sensor 42, the turbocharger system 18, the TIAP sensor 26, and the ITV 22. The TCIAP sensor 42 generates a TCIAP signal TurboIAP that is indicative of an absolute pressure upstream of the turbocharger system 18. The air is drawn into the intake manifold 34. The air within the intake manifold 34 is distributed into cylinders 44. An intake manifold absolute pressure (MAP) sensor 46 detects air pressure within the intake manifold 34 and generates a MAP signal IMAP. Although FIG. 1 depicts six cylinders, the engine 12 may include any number of cylinders 44.

Fuel is provided via fuel rails 48, 50 and combined with the air that is drawn into the cylinders 44. Although a gasoline powered internal combustion engine may be shown, the embodiments disclosed herein apply to diesel or alternative fuel sourced engines. An air/fuel mixture is compressed and ignited in the cylinders 44 to produce drive torque of the engine 12.

An engine speed sensor 52 generates an engine speed signal RPM that indicates speed of the engine 12 in revolutions per minute (RPM). Combustion exhaust within the cylinders 44 is forced out via exhaust manifolds 54, 56. The exhaust travels through exhaust conduits 58, 60, and is directed to the turbocharger system 18.

The turbocharger system 18 may include a primary turbocharger 62 and a secondary turbocharger 64. The primary turbocharger 62 may include a variable geometry turbine (VGT) 66 and a high-pressure compressor (HPC) 68. The HPC 68 spins and forces air into the cylinders 44 when exhaust gas flows through the VGT 66. The VGT 66 may have a set of movable vanes (not shown) to control pressure of the exhaust gas flowing through the primary turbocharger 62. For example, the vanes are partially closed to increase speed of the primary turbocharger 62 when the exhaust flow is low. As engine speed increases, the vanes may be opened to reduce the speed of the primary turbocharger 62.

The secondary turbocharger 64 may include a fixed geometry turbine (FGT) 70 and a low-pressure compressor (LPC) 72. The exhaust through the FGT 70 causes the LPC 72 to spin and compress air. The exhaust gas flows from the exhaust manifolds 54, 56 into the VGT 66 and then through the FGT 70. As the engine speed increases and boost pressure rises in the VGT 66, the BPV 36 may be opened to allow the exhaust gas to flow through the FGT 70. Similarly, the wastegate 38 may be opened to allow the exhaust gas to bypass the FGT 70 when boost pressure in the FGT 70 is greater than a predetermined threshold. A compressor bypass valve (CBPV) 74 may operate in conjunction with the BPV 36. In another embodiment, the CBPV 74 and the BPV 36 may operate independently. The CBPV 74 prevents the HPC 68 from spinning faster than a predetermined speed.

In FIG. 2, the throttle control system 16 is shown. The throttle control system 16 may include the TIAP security control module 28 and the throttle control module 30. The TIAP security control module 28 may include a wastegate and BPV monitoring module 202, a TIAP signal monitoring module 204, a rate determination module 206, a limiting rate selection module 208, a TIAP calculation module 210, and a minimum check module 212.

The wastegate and BPV monitoring module 202 may monitor the BPV 36 and the wastegate 38 and generate a status signal STAT that is a TRUE or FALSE indication of whether one of the BPV 36 and the wastegate 38 is open. The TIAP signal monitoring module 204 may iteratively detect (i.e., sample) a current TIAP signal $TIAP_{CURR}$ from the TIAP sensor 26 at a predetermined sampling interval. For example, the sampling interval may be a period of 12.5 milliseconds. The rate determination module 206 may receive the current TIAP signal $TIAP_{CURR}$ at the predetermined sampling interval and generate a pressure rate value PRV of the current TIAP signal $TIAP_{CURR}$.

The pressure rate value PRV refers to a speed at which air pressure changes over a predetermined period (e.g., 7 kPa/ 12.5 milliseconds). The pressure rate value PRV may be determined based on a pressure difference between a current TIAP signal and a previous TIAP signal generated before the predetermined sampling interval. For example, a current pressure (e.g., 10 kPa) may be subtracted from a previous pressure (e.g., 13 kPa) that was detected during a previous interval (e.g., a previous 12.5 milliseconds) to generate a pressure rate value PRV (e.g., +3 kPa/12.5 milliseconds). A clock signal CLK from a timer 214 may be used to detect start and end times of the predetermined sampling interval.

The limiting rate selection module 208 may select a limiting rate LR based on the pressure rate value PRV, the status signal STAT, and a detection counter 216. The limiting rate LR refers to a maximum allowable pressure change in the calculated TIAP signal $TIAP_{CALC}$. For example, the pressure change in the calculated TIAP signal $TIAP_{CALC}$ may be limited to 112 kPa/second.

The limiting rate LR may be selected from an increasing limiting rate 220 and a set of M decreasing limiting rates 221, where M is an integer greater than 1. As an example, the limiting rate LR may be selected from the increasing limiting rate 220 and a set of three decreasing limiting rates 222-226. The limiting rate LR may be one of the increasing limiting rate 220, a first decreasing limiting rate 222, a second decreasing limiting rate 224, and a third decreasing limiting rate 226.

The second decreasing limiting rate 224 may be greater than the first and third decreasing limiting rates 222, 226 and the third decreasing limiting rate 226 may be greater than or equal to the first decreasing limiting rate 222. For example, the second decreasing limiting rate 224 may be set to 112 kPa/second and the first and third decreasing limiting rates 222, 226 may be set to 1 kPa/second. The limiting rates 220-228 may be calibrated and stored in memory 218.

The limiting rate LR may be used to determine an increasing or decreasing pressure rate value PRV of the calculated TIAP signal $TIAP_{CALC}$. For example, the second decreasing limiting rate 224 may limit the pressure rate value PRV to a first predetermined pressure rate (e.g., 112 kPa/second). Similarly, the third decreasing limiting rate 226 may limit the pressure rate value PRV to a second predetermined pressure rate (e.g., 1 kPa/second). This indicates that the calculated TIAP signal $TIAP_{CALC}$ using the second decreasing limiting rate 224 decreases faster than using the third decreasing limiting rate 226. Other examples of these limiting rates are described with respect to the embodiments of FIGS. 3A-3D.

A number of detections (i.e., samples) of the current TIAP signal $TIAP_{CURR}$ may be limited to N samples when the second decreasing limiting rate 224 is selected. N is an integer greater than 1. The detection counter 216 may be stored in the memory 218 and used to count the number of samples.

The TIAP calculation module 210 may generate the calculated TIAP signal $TIAP_{CALC}$ based on the limiting rate LR and the current TIAP signal $TIAP_{CURR}$. For example, the calculated TIAP signal $TIAP_{CALC}$ may be initially set to an equal value of the current TIAP signal $TIAP_{CURR}$. The TIAP calculation module 210 may increase or decrease the calculated TIAP signal $TIAP_{CALC}$ based on the limiting rate LR.

The minimum check module 212 may detect a minimum value of the calculated TIAP signal $TIAP_{CALC}$ and generate a conditioned calculated TIAP signal $TIAP_{MIN}$ based on a MAP signal IMAP and a TCIAP signal TurboIAP. The minimum value may be set to a greater one of the MAP signal IMAP and the TCIAP signal TurboIAP. The MAP signal IMAP and the TCIAP signal TurboIAP may be offset by calibrated offset values. As an example, a calibrated offset value may be set equal to 1-2 kPa. The calibrated offset values may be determined based on, for example, a voltage and current variation of the MAP and TCIAP sensors 42, 46, sensor sensitivities, sensor locations and/or instrumentation noise.

The throttle control module 30 may receive the conditioned calculated TIAP signal $TIAP_{MIN}$ and generate a throttle control signal THR based on the conditioned calculated TIAP signal $TIAP_{MIN}$. The throttle control module 30 may actuate the ITV 22 based on the throttle control signal THR. The throttle control module 30 may control torque output of the engine 12 by regulating the ITV 22 based on the throttle control signal THR.

In FIGS. 3A-3D, an exemplary method of controlling pre-throttle intake air pressure is shown. Although the following steps are primarily described with respect to the embodiments of FIGS. 1-2, the steps may be modified to apply to other embodiments of the present disclosure. The TIAP security control module 28 of FIG. 1 may perform and provide the control for the following steps 302-352.

Figure 3A:
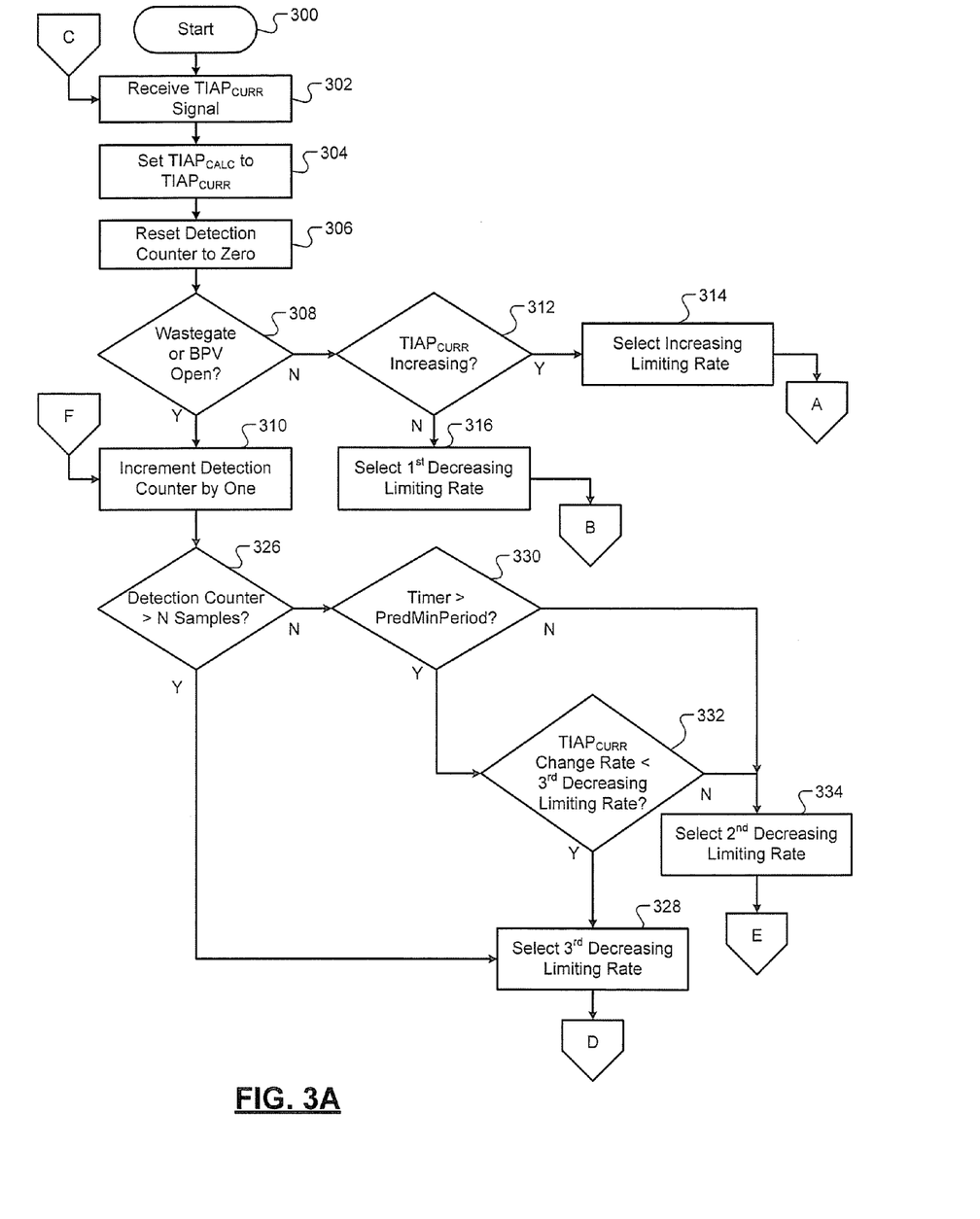
FIGS. 3A-3D illustrate a method of controlling pre-throttle intake air pressure in accordance with an embodiment of the present disclosure.

The method may begin at 300. In step 302, the TIAP signal monitoring module 204 may receive a current TIAP signal $TIAP_{CURR}$ from the TIAP sensor 26. In step 304, the TIAP calculation module 210 may initially generate and set a calculated TIAP signal $TIAP_{CALC}$ to the current TIAP signal $TIAP_{CURR}$. The current and calculated TIAP signals $TIAP_{CURR}$, $TIAP_{CALC}$ may have equal initial values.

In step 306, the TIAP signal monitoring module 204 may initially reset the detection counter 216 in the memory 218 to zero. In step 308, the wastegate and BPV monitoring module 202 may generate the status signal STAT. Control may proceed to step 310 when the status signal STAT is TRUE, otherwise control may proceed to step 312. In step 310, the TIAP signal monitoring module 204 may detect the current TIAP signal $TIAP_{CURR}$ and increment the detection counter 216 by one.

In step 312, the rate determination module 206 may receive the current TIAP signal $TIAP_{CURR}$ from the TIAP signal monitoring module 204 at a predetermined sampling interval (e.g., 12.5 milliseconds). The rate determination module 206 may generate a pressure rate value PRV of the current TIAP signal $TIAP_{CURR}$. The pressure rate value PRV may be determined based on a pressure difference between a current TIAP signal and a previous TIAP signal generated before the predetermined sampling interval.

For example, the current TIAP signal (e.g., 13 kPa) may be subtracted from the previous TIAP signal (e.g., 10 kPa) to generate a pressure rate value PRV of −3 kPa/12.5 milliseconds. For example only, a negative pressure rate value may indicate that the current TIAP signal $TIAP_{CURR}$ is increasing. Similarly, a positive pressure rate value may indicate that the current TIAP signal $TIAP_{CURR}$ is decreasing. Control may proceed to step 314 when the pressure rate value PRV indicates that the current TIAP signal $TIAP_{CURR}$ is increasing, otherwise control may proceed to step 316.

Figure 4:
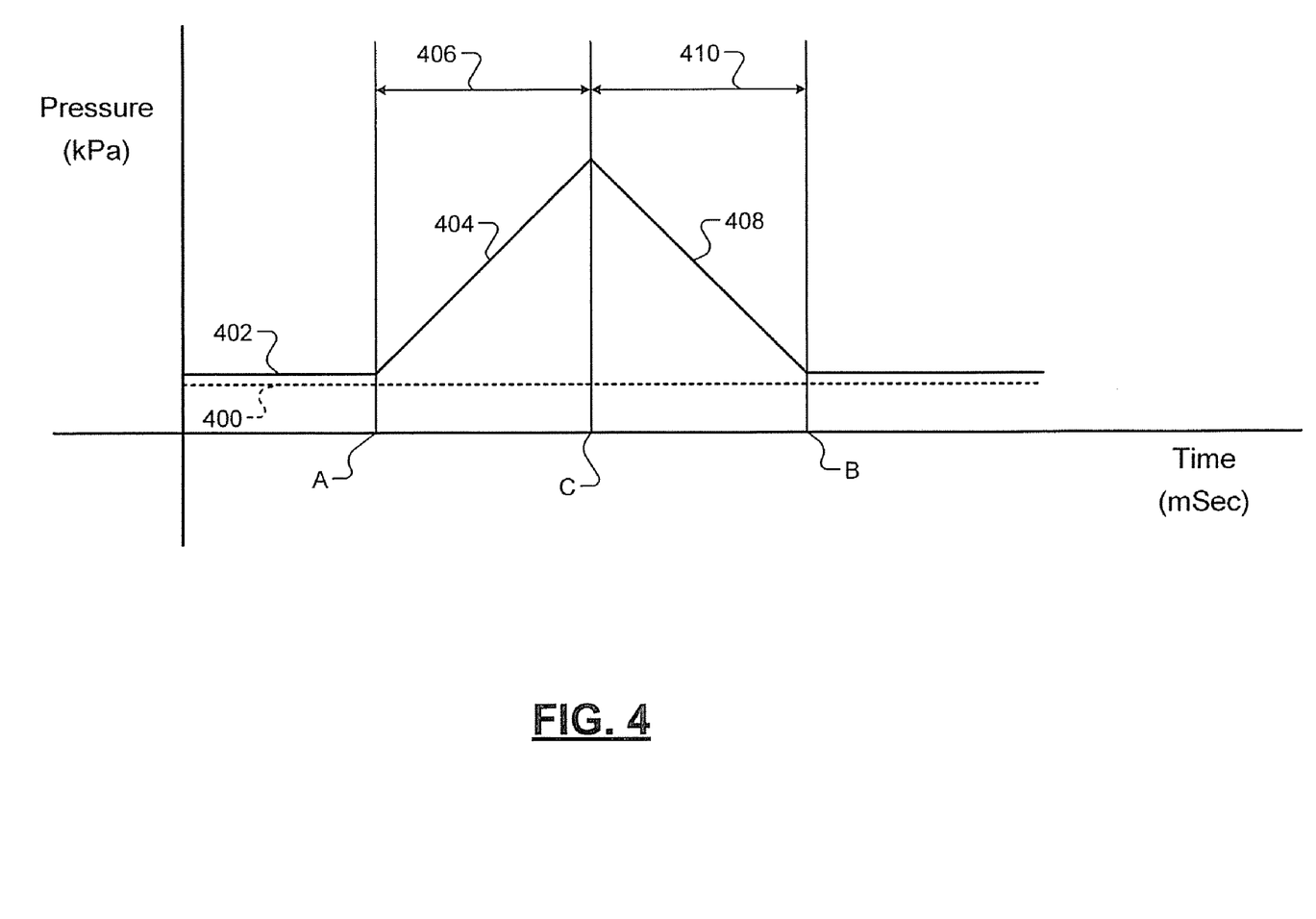
FIG. 4 is an exemplary plot of a first throttle inlet absolute pressure (TIAP) signal of a turbocharged engine and a second TIAP signal of an engine without a turbocharger.

Referring now also to FIG. 4, an exemplary plot of a first TIAP signal 400 of an engine without a turbocharger (i.e., non-turbo engine) and a second TIAP signal 402 of a turbocharged engine (i.e., turbo engine) is shown. The first TIAP signal 400 may remain at a constant level during engine operation. The second TIAP signal 402 may have a triangular profile during a turbocharger boost period, such as between points A and B. During the turbocharger boost period, the turbocharger system 18 increases boost pressure for an increased torque output of the engine 12.

Point A identifies a start time of the turbocharger boost period and point B identifies an end time of the turbocharger boost period. Point C identifies a time when at least one of the BPV 36 and the wastegate 38 is opened to reduce the boost pressure and thereby avoid potential hardware damage to the engine 12. A first segment 404 of the second TIAP signal 402 is associated with increasing air pressure in the intake manifold 34 and is between points A and C with a first duration designated 406. A second segment 408 of the second TIAP signal 402 is associated with decreasing air pressure and is between points C and B with a second duration designated 410. The air pressure decrease may cause a sail-on condition between points C and B and/or during the second duration 410.

Referring now again to FIG. 3A, in step 314, the limiting rate selection module 208 may select an increasing limiting rate 220 as a limiting rate LR when certain conditions are satisfied. The conditions for the increasing limiting rate 220 may include the pressure rate value PRV indicating that the current TIAP signal $TIAP_{CURR}$ is increasing and the status signal STAT being FALSE (i.e., the BPV 36 and the wastegate 38 are closed).

In step 316, the limiting rate selection module 208 may select a first decreasing limiting rate 222 as the limiting rate LR when certain conditions are satisfied. The conditions for the first decreasing limiting rate 222 may include the pressure rate value PRV indicating that the current TIAP signal $TIAP_{CURR}$ is decreasing and the status signal STAT being FALSE.

Figure 3B:
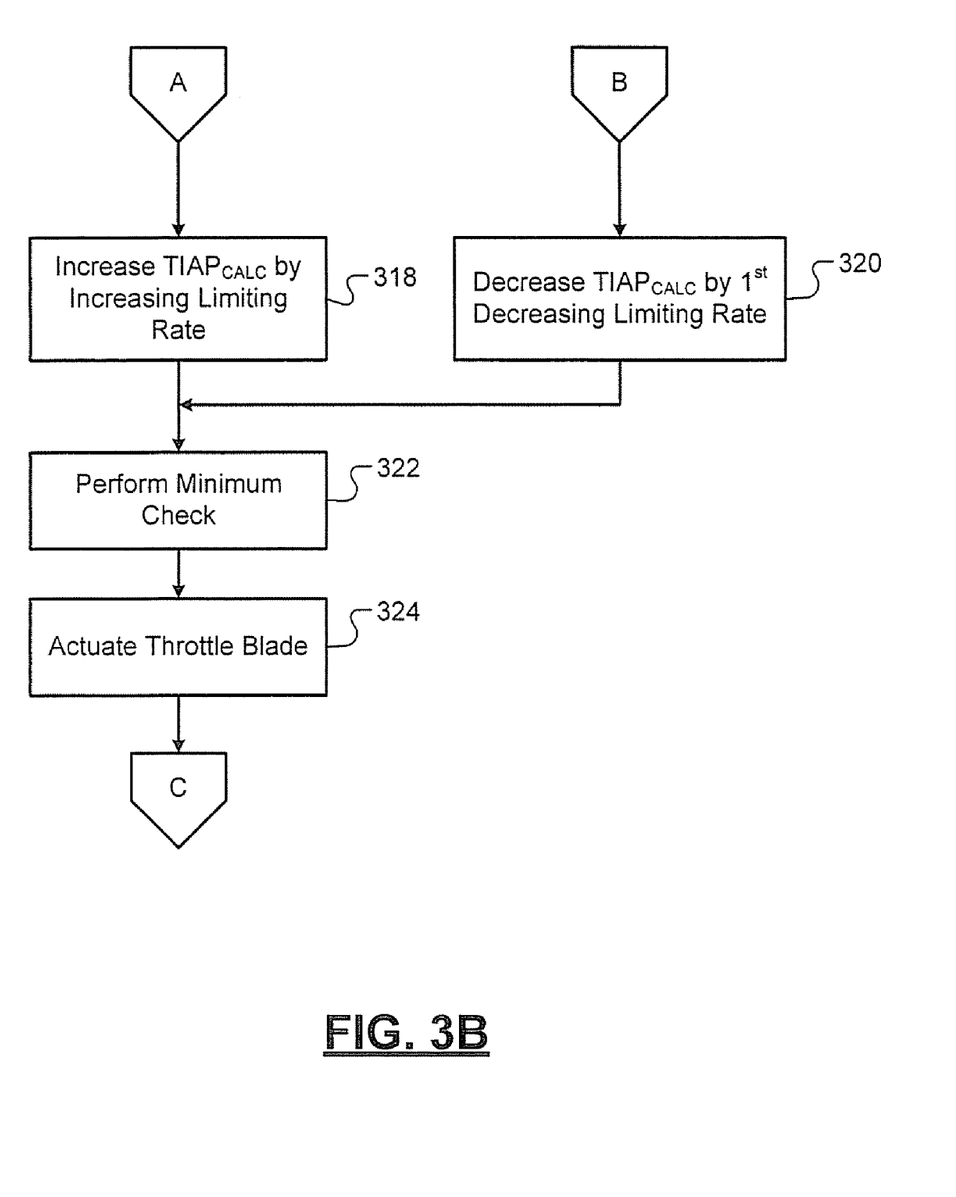

Referring now also to FIG. 3B, in step 318, the TIAP calculation module 210 may generate the calculated TIAP signal $TIAP_{CALC}$ by increasing the calculated TIAP signal $TIAP_{CALC}$ based on the limiting rate LR. For example, the calculated TIAP signal $TIAP_{CALC}$ may be increased by the increasing limiting rate 220. In step 320, the TIAP calculation module 210 may generate the calculated TIAP signal $TIAP_{CALC}$ by decreasing the calculated TIAP signal $TIAP_{CALC}$ based on the limiting rate LR. For example, the calculated TIAP signal $TIAP_{CALC}$ may be decreased by the first decreasing limiting rate 222.

In step 322, the minimum check module 212 may detect a minimum value of the calculated TIAP signal $TIAP_{CALC}$ and generate the conditioned calculated TIAP signal $TIAP_{MIN}$ based on a MAP signal IMAP and a TCIAP signal TurboIAP. In step 324, the throttle control module 30 generates a throttle control signal THR based on the calculated TIAP signal $TIAP_{CALC}$ and actuates the ITV 22 based on the throttle control signal THR.

Figure 3C:
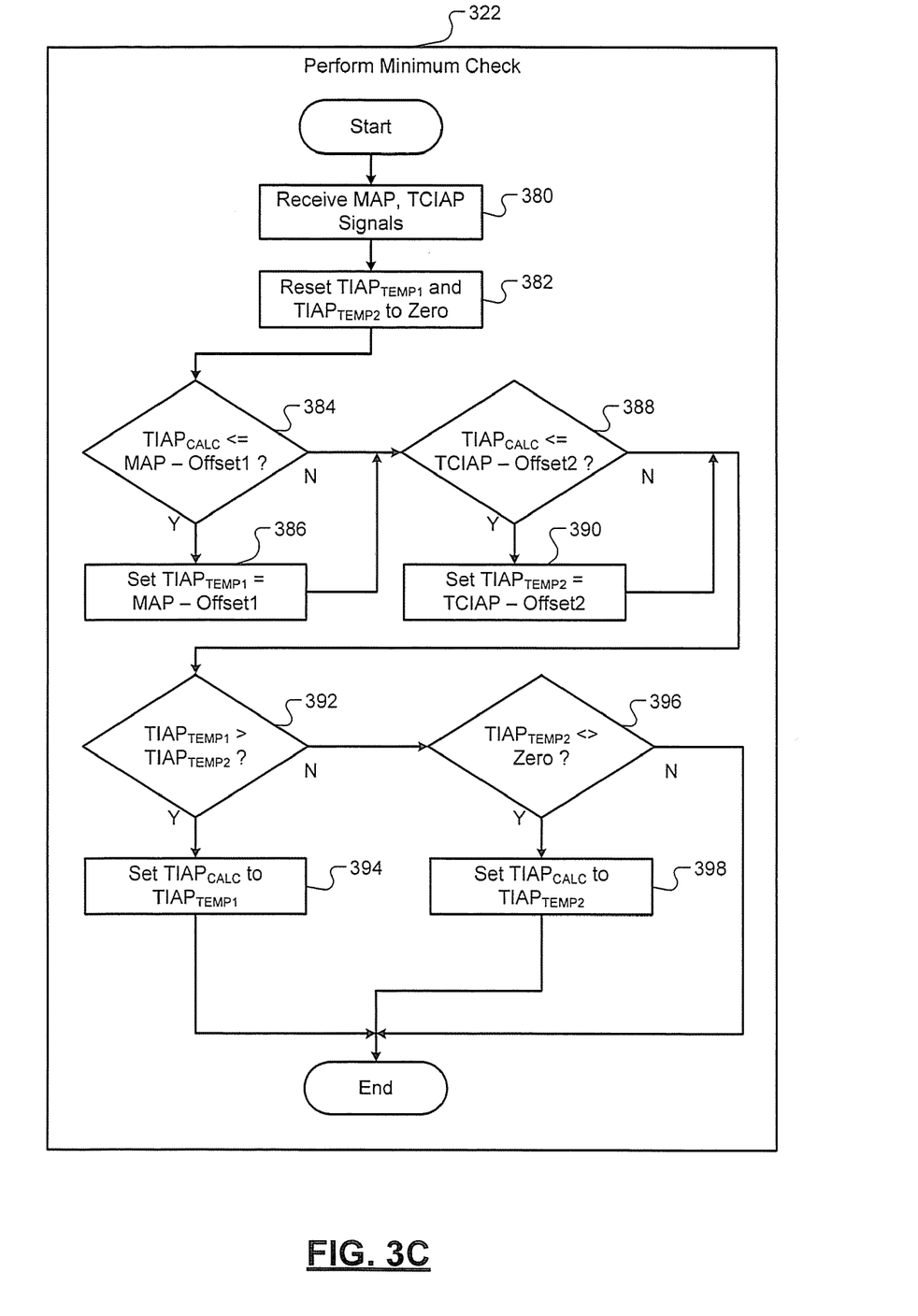

Referring now also to FIG. 3C, an exemplary minimum check of step 322 is shown. In step 380, the minimum check module 212 may receive the TCIAP and MAP signals TurboIAP, IMAP from the TCIAP and MAP sensors 42, 46. In step 382, the minimum check module 212 may reset first and second temporary variables $TIAP_{TEMP1}$ and $TIAP_{TEMP2}$ to zero.

In step 384, the minimum check module 212 may proceed to step 386 when the calculated TIAP signal $TIAP_{CALC}$ is less than or equal to the MAP signal IMAP with a first offset Offset1. The first offset Offset1 refers to a calibrated offset value for the MAP sensor 46. The first offset Offset1 may be subtracted from the MAP signal IMAP to provide a first value of the MAP signal IMAP with the first offset Offset1 before a comparison with the calculated TIAP signal $TIAP_{CALC}$. The minimum check module 212 may proceed to step 386 when the calculated TIAP signal $TIAP_{CALC}$ is less than or equal to the first value, otherwise the minimum check module 212 may proceed to step 388. In step 386, the minimum check module 212 may set the first temporary variable $TIAP_{TEMP1}$ to the first value.

In step 388, the minimum check module 212 may proceed to step 390 when the calculated TIAP signal $TIAP_{CALC}$ is less than or equal to the TCIAP signal TurboIAP with a second offset Offset2. The second offset Offset2 refers to a calibrated offset value for the TCIAP sensor 42. The second offset Offset2 may be subtracted from the TCIAP signal TurboIAP to provide a second value of the TCIAP signal TurboIAP with the second offset Offset2 before a comparison with the calculated TIAP signal $TIAP_{CALC}$. The minimum check module 212 may proceed to step 390 when the calculated TIAP signal $TIAP_{CALC}$ is less than or equal to the second value, otherwise the minimum check module 212 may proceed to step 392. In step 390, the minimum check module 212 may set the second temporary variable $TIAP_{TEMP2}$ to the second value.

In step 392, the minimum check module 212 may proceed to step 394 when the first temporary variable $TIAP_{TEMP1}$ is greater than the second temporary variable $TIAP_{TEMP2}$, otherwise the minimum check module 212 may proceed to step 396. In step 394, the minimum check module 212 may set the calculated TIAP signal $TIAP_{CALC}$ to the first temporary variable $TIAP_{TEMP1}$.

In step 396, the minimum check module 212 may proceed to step 398 when the second temporary variable $TIAP_{TEMP2}$ is not equal to zero, otherwise the minimum check module 212 may end without modifying the calculated TIAP signal $TIAP_{CALC}$. In step 398, the minimum check module 212 may set the calculated TIAP signal $TIAP_{CALC}$ to the second temporary variable $TIAP_{TEMP2}$.

Referring now again to FIG. 3A, in step 326, control may proceed to step 328 when the detection counter 216 is greater than N, otherwise control may proceed to step 330. N is a predetermined maximum number of samples of the current TIAP signal $TIAP_{CURR}$ while the second decreasing limiting rate 224 is applied. N is an integer greater than 1.

In step 330, the limiting rate selection module 208 may calculate a period between a time the status signal STAT becomes TRUE and a current time based on the clock signal CLK. For example, the limiting rate selection module 208 may access the timer 214 to receive an initial timestamp of when one of the BPV 26 and the wastegate 38 is open. The timer 214 compares the initial timestamp with a current timestamp based on the clock signal CLK. Control may proceed to step 332 when the period is greater than a predetermined minimum period, otherwise control may proceed to step 334.

During the predetermined minimum period, the limiting rate selection module 208 may select the second decreasing limiting rate 224 as the limiting rate LR. The predetermined minimum period may also be used for stabilizing air pressure upstream of the ITV 22. For example only, the air pressure upstream of the ITV 22 may be unstable for the predetermined minimum period due to exhaust backpressure generated when one of the BPV 36 and the wastegate 38 is open.

In step 332, the current TIAP signal $TIAP_{CURR}$ may be detected by the TIAP signal monitoring module 204. The rate determination module 206 may receive the current TIAP signal $TIAP_{CURR}$ and generate the pressure rate value PRV of the current TIAP signal $TIAP_{CURR}$. The pressure rate value PRV may be generated based on a pressure difference between a current TIAP signal and a previous TIAP signal generated before a predetermined period. Control may proceed to step 328 when the pressure rate value PRV of the current TIAP signal $TIAP_{CURR}$ is less than the third decreasing limiting rate 226, otherwise control may proceed to step 334.

In step 328, the limiting rate selection module 208 may select a third decreasing limiting rate 226 as the limiting rate LR when certain conditions are satisfied. The conditions for the third decreasing limiting rate 226 may include: the status signal STAT being TRUE; and the pressure rate value PRV of the current TIAP signal $TIAP_{CURR}$ being less than the third decreasing limiting rate 226 or the detection counter 216 being greater than N.

In step 334, the limiting rate selection module 208 may select the second decreasing limiting rate 224 as the limiting rate LR when certain conditions are satisfied. The conditions for the second decreasing limiting rate 224 may include: the status signal STAT being TRUE; the pressure rate value PRV of the current TIAP signal $TIAP_{CURR}$ being greater than or equal to the third decreasing limiting rate 226; and the detection counter 216 being less than or equal to N.

Figure 5:
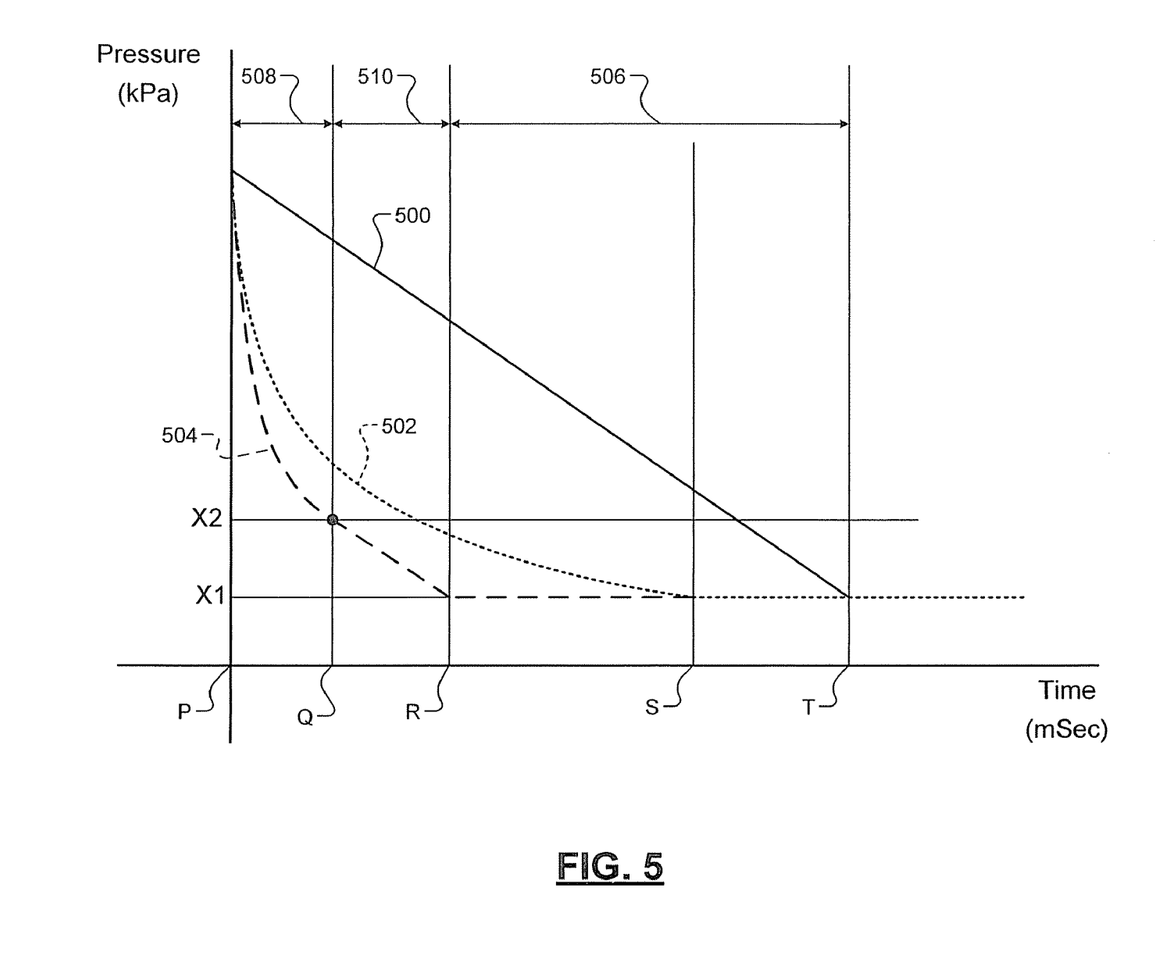
FIG. 5 is an exemplary plot of a conventional TIAP signal and a TIAP signal generated by a system of the present disclosure.

Referring now also to FIG. 5, an exemplary plot of a first calculated TIAP signal 500 using a conventional limiting rate, a current TIAP signal 502, and a second calculated TIAP signal 504 using limiting rates of the present disclosure is shown. The signals 500, 502, 504 may start to decrease at point P. Point P identifies a time when at least one of the BPV 36 and the wastegate 38 is opened to relieve air pressure in the turbocharger system 18. The air pressure may be accumulated in the turbocharger system 18 during a turbocharger boost operation. A sail-on condition may start at point P as a result of a pressure drop caused by an opening event of the BPV 36 and/or the wastegate 38.

The first calculated TIAP signal 500 may illustrate that the sail-on condition continues during a period between points P and T. Point T identifies an end time of the sail-on condition for the first calculated TIAP signal 500. The current TIAP signal 502 may indicate ambient air pressure in one of the BPV 36 and the wastegate 38. The ambient air pressure of the BPV 36 and/or the wastegate 38 may start to decrease at point P and continue to decrease until point S. Point S identifies a time when the ambient air pressure is stabilized at pressure X1. Pressure X1 may be equal to the MAP signal IMAP and/or the TCIAP signal TurboIAP with corresponding calibrated offsets.

The second calculated TIAP signal 504 may illustrate that the sail-on condition continues during a period between points P and R. Point R identifies an end time of the sail-on condition for the second calculated TIAP signal 504. An application of the second and third decreasing limiting rates 224, 226 reduces duration of the sail-on condition. This is indicated by a reduction in time between points R and T (designated 506). In contrast, an application of the conventional limiting rate may increase the period of the sail-on condition. The second and third decreasing limiting rates 224, 226 are respectively applied during period 508 (time between points P and Q) and during period 510 (time between points Q and R).

Point (Q, X2) is associated with when a pressure rate value PRV of the current TIAP signal 502 is less than the third decreasing limiting rate 226 and/or the detection counter 216 is greater than N. The third decreasing limiting rate 226 may be applied at point (Q, X2) and continue to be applied until the time of point R. Although the detection counter 216 is described herein, a detection timer may also be implemented to limit the application of the second decreasing limiting rate 224 during period 508.

Figure 3D:
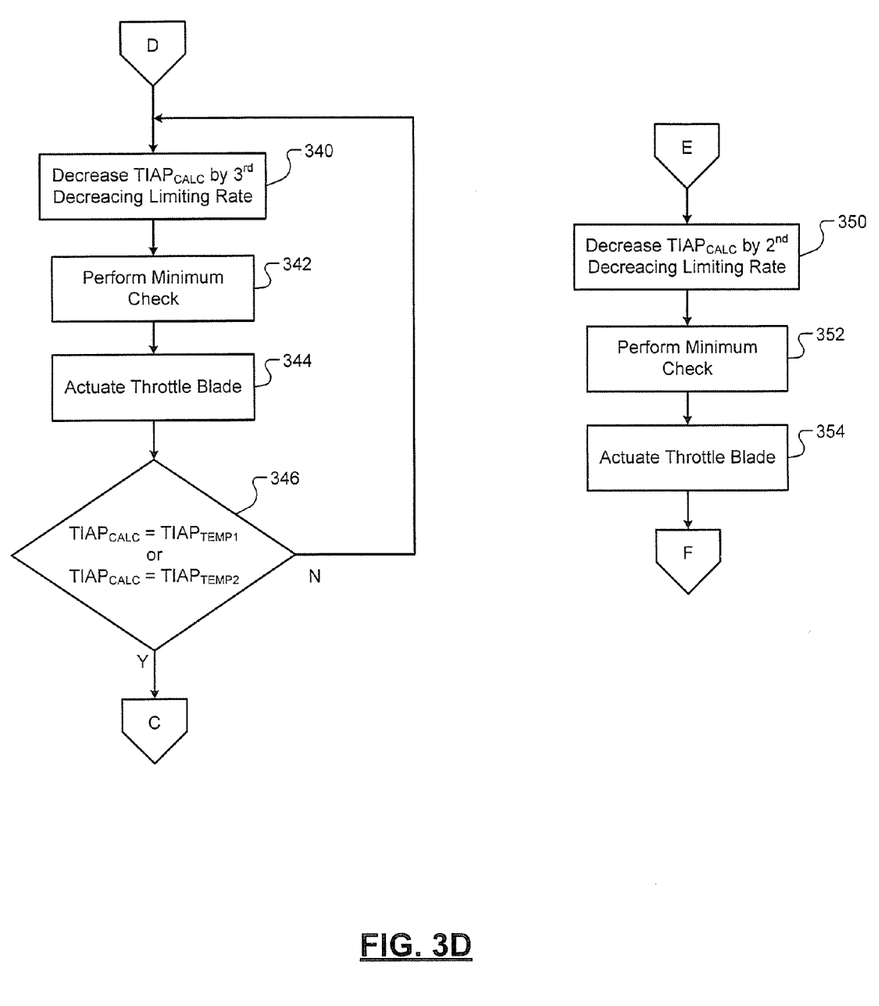

Referring now also to FIG. 3D, in step 340, the TIAP calculation module 210 may generate the calculated TIAP signal $TIAP_{CALC}$ by decreasing the calculated TIAP signal $TIAP_{CALC}$ based on the limiting rate LR. For example, the calculated TIAP signal $TIAP_{CALC}$ may be decreased by the third decreasing limiting rate 226. In step 342, the minimum check module 212 may detect a minimum value of the calculated TIAP signal $TIAP_{CALC}$ and generate the conditioned calculated TIAP signal $TIAP_{MIN}$ based on a MAP signal IMAP and a TCIAP signal TurboIAP. In step 344, the throttle control module 30 generates a throttle control signal THR based on the calculated TIAP signal $TIAP_{CALC}$ and actuates the ITV 22 based on the throttle control signal THR.

In step 346, control may proceed to step 302 when the calculated TIAP signal $TIAP_{CALC}$ is equal to one of the first and second temporary variables $TIAP_{TEMP1}$, $TIAP_{TEMP2}$, otherwise control may return to step 340. As shown in FIG. 3C, a minimum value of the calculated TIAP signal $TIAP_{CALC}$ may be limited to one of the first and second temporary variables $TIAP_{TEMP1}$, $TIAP_{TEMP2}$. The first and second temporary variables $TIAP_{TEMP1}$, $TIAP_{TEMP2}$ are determined based on the MAP signal IMAP and the TCIAP signal TurboIAP with corresponding calibrated offsets.

In step 350, the TIAP calculation module 210 may generate the calculated TIAP signal $TIAP_{CALC}$ by decreasing the calculated TIAP signal $TIAP_{CALC}$ based on the limiting rate LR. For example, the calculated TIAP signal $TIAP_{CALC}$ may be decreased by the second decreasing limiting rate 224.

In step 352, the minimum check module 212 may detect a minimum value of the calculated TIAP signal $TIAP_{CALC}$ and generate the conditioned calculated TIAP signal $TIAP_{MIN}$ based on a MAP signal IMAP and a TCIAP signal TurboIAP. In step 354, the throttle control module 30 generates a throttle control signal THR based on the calculated TIAP signal $TIAP_{CALC}$ and actuates the ITV 22 based on the throttle control signal THR.

The above-described steps are meant to be illustrative examples; the steps may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine with a turbocharger system, the control system comprising:
   a rate determination module that generates a pressure rate value based on a pressure difference between a current throttle inlet absolute pressure (TIAP) signal from a TIAP sensor and a previous TIAP signal;
   a limiting rate selection module that selects a limiting rate based on the pressure rate value;
   a TIAP calculation module that generates a calculated TIAP signal based on the limiting rate and the current TIAP signal; and
   a throttle control module that generates a throttle control signal based on the calculated TIAP signal and actuates an inlet throttle valve (ITV) of the engine based on the throttle control signal.

2. The control system of claim 1, further comprising:
a wastegate and bypass valve (BPV) monitoring module that generates a status signal based on an opening of at least one of a BPV and a wastegate of the turbocharger system;
a TIAP signal monitoring module that iteratively samples the current TIAP signal at predetermined sampling intervals; and
a minimum check module that detects a minimum value of the calculated TIAP signal based on an intake manifold absolute pressure (MAP) signal from a MAP sensor and a turbocharger inlet absolute pressure (TCIAP) signal from a TCIAP sensor,
wherein the TCIAP signal is indicative of an absolute pressure upstream of the turbocharger system and the MAP signal is indicative of an absolute pressure within an intake manifold of the engine.

3. The control system of claim 1, wherein the pressure rate value indicates that the current TIAP signal is one of increasing and decreasing,
wherein the current TIAP signal is indicative of an absolute pressure upstream of the ITV, and
wherein the TIAP sensor is positioned between the turbocharger system and the ITV.

4. The control system of claim 1, wherein the turbocharger system includes at least one of a BPV and a wastegate,
wherein at least one of the BPV and the wastegate is opened when boost pressure of the turbocharger system is greater than a predetermined threshold.

5. The control system of claim 2, wherein the minimum check module sets a first temporary variable to the MAP signal with a first offset associated with the MAP sensor when the calculated TIAP signal is less than or equal to the MAP signal with the first offset,
wherein the minimum check module sets a second temporary variable to the TCIAP signal with a second offset associated with the TCIAP sensor when the calculated TIAP signal is less than or equal to the TCIAP signal with the second offset, and
wherein the minimum check module sets the calculated TIAP signal to a greater one of the first temporary variable and the second temporary variable when the first temporary variable and the second temporary variable are not equal to zero.

6. The control system of claim 1, wherein the limiting rate selection module selects the limiting rate from one of an increasing limiting rate and M decreasing limiting rates, where M is an integer greater than 1.

7. The control system of claim 1, wherein the limiting rate selection module selects the limiting rate from one of an increasing limiting rate, a first decreasing limiting rate, a second decreasing limiting rate, and a third decreasing limiting rate, and
wherein the second decreasing limiting rate is greater than the first and third decreasing limiting rates and the third decreasing limiting rate is greater than or equal to the first decreasing limiting rate.

8. The control system of claim 7, wherein the TIAP calculation module sets the calculated TIAP signal to the current TIAP signal and increases the calculated TIAP signal by the increasing limiting rate during a first period,
wherein the TIAP calculation module sets the calculated TIAP signal to the current TIAP signal and decreases the calculated TIAP signal by the first decreasing limiting rate during a second period, and
wherein the first period is before the second period.

9. The control system of claim 7, wherein the TIAP calculation module sets the calculated TIAP signal to the current TIAP signal and decreases the calculated TIAP signal by the second decreasing limiting rate during a first period,
wherein the TIAP calculation module sets the calculated TIAP signal to the current TIAP signal and decreases the calculated TIAP signal by the third decreasing limiting rate during a second period, and
wherein the first period is before the second period.

10. The control system of claim 7, wherein the limiting rate selection module selects the increasing limiting rate when the current TIAP signal is increasing and the BPV and a wastegate are closed, and
wherein the limiting rate selection module selects the first decreasing limiting rate when the current TIAP signal is decreasing and the BPV and the wastegate are closed.

11. The control system of claim 7, wherein the TIAP signal monitoring module limits a number of samples of the current TIAP signal to N samples based on the limiting rate, where N is an integer greater than 1,
wherein the TIAP signal monitoring module increments a detection counter by one when the TIAP signal monitoring module samples the current TIAP signal.

12. The control system of claim 11, wherein the limiting rate selection module selects the second decreasing limiting rate when at least one of the BPV and a wastegate is opened, the detection counter is less than or equal to N, and the pressure rate value is greater than or equal to the third decreasing limiting rate.

13. The control system of claim 11, wherein the limiting rate selection module selects the third decreasing limiting rate when at least one of the BPV and a wastegate is opened, the detection counter is less than or equal to N, and the pressure rate value is less than the third decreasing limiting rate, and
wherein the limiting rate selection module selects the third decreasing limiting rate when at least one of the BPV and a wastegate is opened and the detection counter is greater than N.

14. A method of controlling air pressure in an engine with a turbocharger system comprising:
generating a pressure rate value based on a pressure difference between a current throttle inlet absolute pressure (TIAP) signal from a TIAP sensor and a previous TIAP signal;
selecting a limiting rate based on the pressure rate value;
generating a calculated TIAP signal based on the limiting rate and the current TIAP signal;
generating a throttle control signal based on the calculated TIAP signal; and
actuating an inlet throttle valve (ITV) of the engine based on the throttle control signal.

15. The method of claim 14, further comprising:
generating a status signal based on an opening of at least one of a bypass valve (BPV) and a wastegate of the turbocharger system;
iteratively sampling the current TIAP signal at predetermined sampling intervals;
detecting a minimum value of the calculated TIAP signal based on an intake manifold absolute pressure (MAP) signal from a MAP sensor and a turbocharger inlet absolute pressure (TCIAP) signal from a TCIAP sensor;
indicating an absolute pressure upstream of the turbocharger system of the engine via the TCIAP signal;
indicating an absolute pressure within an intake manifold of the engine via the MAP signal;
indicating that the current TIAP signal is one of increasing and decreasing via the pressure rate value;

indicating an absolute pressure upstream of the ITV via the current TIAP signal; and positioning the TIAP sensor between the turbocharger system and the ITV.

16. The method of claim 15, further comprising:

including at least one of a bypass valve (BPV) and a wastegate for the turbocharger system; and opening at least one of the BPV and the wastegate when boost pressure of the turbocharger system is greater than a predetermined threshold.

17. The method of claim 15, further comprising:

setting a first temporary variable to the MAP signal with a first offset associated with the MAP sensor when the calculated TIAP signal is less than or equal to the MAP signal with the first offset;

setting a second temporary variable to the TCIAP signal with a second offset associated with the TCIAP sensor when the calculated TIAP signal is less than or equal to the TCIAP signal with the second offset; and setting the calculated TIAP signal to a greater one of the first temporary variable and the second temporary variable when the first temporary variable and the second temporary variable are not equal to zero.

18. The method of claim 15, further comprising:

selecting the limiting rate from one of an increasing limiting rate, a first decreasing limiting rate, a second decreasing limiting rate, and a third decreasing limiting rate, wherein the second decreasing limiting rate is greater than the first and third decreasing limiting rates and the third decreasing limiting rate is greater than or equal to the first decreasing limiting rate;

limiting a number of samples of the current TIAP signal to N samples when the second decreasing limiting rate is selected, where N is an integer greater than 1; and incrementing a detection counter by one when the current TIAP signal is sampled.

19. The method of claim 18, further comprising:

setting the calculated TIAP signal to the current TIAP signal and increasing the calculated TIAP signal by the increasing limiting rate during a first period;

setting the calculated TIAP signal to the current TIAP signal and decreasing the calculated TIAP signal by the first decreasing limiting rate during a second period;

setting the calculated TIAP signal to the current TIAP signal and decreasing the calculated TIAP signal by the second decreasing limiting rate during the second period; and setting the calculated TIAP signal to the current TIAP signal and decreasing the calculated TIAP signal by the third decreasing limiting rate during the second period, wherein the first period is before the second period.

20. The method of claim 18, further comprising:

selecting the increasing limiting rate when the current TIAP signal is increasing and the BPV and the wastegate are closed;

selecting the first decreasing limiting rate when the current TIAP signal is decreasing and the BPV and the wastegate are closed;

selecting the second decreasing limiting rate when at least one of the BPV and the wastegate is opened, the detection counter is less than or equal to N, and the pressure rate value is greater than or equal to the third decreasing limiting rate;

selecting the third decreasing limiting rate when at least one of the BPV and the wastegate is opened, the detection counter is less than or equal to N, and the pressure rate value is less than the third decreasing limiting rate; and selecting the third decreasing limiting rate when at least one of the BPV and the wastegate is opened and the detection counter is greater than N.

* * * * *